United States Patent
Chen et al.

(10) Patent No.: US 12,135,603 B2
(45) Date of Patent: Nov. 5, 2024

(54) MONITORING ENERGY CONSUMPTION ASSOCIATED WITH USERS OF A DISTRIBUTED COMPUTING SYSTEM USING TRACING

(71) Applicant: RED HAT, INC., Raleigh, NC (US)

(72) Inventors: Huamin Chen, Newton, MA (US); Omri Zeneva, Beer Shiva (IL); Yuval Lifshitz, Kfar HaOranim (IL); Parul Singh, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 97 days.

(21) Appl. No.: 17/889,497

(22) Filed: Aug. 17, 2022

(65) Prior Publication Data
US 2024/0061494 A1     Feb. 22, 2024

(51) Int. Cl.
*G06F 1/3296*     (2019.01)
*G06F 1/3231*     (2019.01)

(52) U.S. Cl.
CPC .......... *G06F 1/3296* (2013.01); *G06F 1/3231* (2013.01)

(58) Field of Classification Search
CPC .... G06F 1/3296; G06F 1/3231; G06F 1/3234; G06F 1/3203; G06F 1/32; G06F 1/26
See application file for complete search history.

(56) References Cited

U.S. PATENT DOCUMENTS

| 9,547,353 | B1 | 1/2017 | Marr et al. | |
|---|---|---|---|---|
| 11,864,110 | B2* | 1/2024 | Couderq | H04B 17/318 |
| 2006/0069786 | A1 | 3/2006 | Mogul et al. | |
| 2011/0213997 | A1* | 9/2011 | Kansal | G06F 1/3206 713/340 |
| 2012/0005490 | A1* | 1/2012 | Goraczko | G06F 1/3206 713/300 |
| 2013/0268940 | A1* | 10/2013 | Gmach | G06F 9/5077 718/104 |
| 2018/0203751 | A1* | 7/2018 | Lee | G06F 11/079 |
| 2019/0251606 | A1 | 8/2019 | Wang et al. | |

(Continued)

FOREIGN PATENT DOCUMENTS

| AU | 2021105891 A4 | 10/2021 |
|---|---|---|
| CN | 105426489 A | 3/2016 |

OTHER PUBLICATIONS

Extended European Search Report for EP Application No. 22215194.6 mailed Jul. 7, 2023.

*Primary Examiner* — Raymond N Phan
(74) *Attorney, Agent, or Firm* — Kilpatrick Townsend & Stockton LLP

(57) ABSTRACT

Energy consumption associated with users of a distributed computing system can be monitored using tracing according to some examples described herein. In one such example, a system can execute tracing software configured to track usage of a software service and generate tracing information. The tracing information cant attribute the usage of the software service to a group of users. The system can analyze the tracing information to determine a portion of the usage to attribute to a given user. The system can then determine an energy consumption estimate for the user, for example based on the portion of the usage associated with the user and an energy consumption amount associated with the software service. A graphical user interface can be generated indicating the energy consumption estimate for the user.

20 Claims, 9 Drawing Sheets

(56) References Cited

U.S. PATENT DOCUMENTS

2019/0340033 A1* 11/2019 Ganteaume ............. H04L 43/16
2022/0058549 A1*  2/2022 Cutts ................... H04L 67/1097
2023/0308352 A1*  9/2023 Chen .................... H04L 45/122

* cited by examiner

| 118 | {Request#1_ID, User#1_ID, Service #1_ID, Service #2_ID, Service #4_ID} | {Request#2_ID, User#1_ID, Service #1_ID, Service #3_ID} | {Request#3_ID, User#2_ID, Service #1_ID, Service #6_ID} | {Request#4_ID, User#1_ID, Service #2_ID, Service #5_ID} | {Request#5_ID, User#2_ID, Service #2_ID, Service #4_ID} | . . . |
|---|---|---|---|---|---|---|
| | 202a | 202b | 202c | 202d | 202e | |

FIG. 2

| SOFTWARE SERVICE | OPERATION 1 | OPERATION 2 |
|---|---|---|
| Software Service #1_ID | 10 W | 15 W |
| Software Service #2_ID | 20 W | 30 W |
| Software Service #3_ID | 30 W | 45 W |
| Software Service #4_ID | 40 W | 40 W |
| Software Service #5_ID | 50 W | 30 W |

MONITORING ENERGY CONSUMPTION ASSOCIATED WITH USERS OF A DISTRIBUTED COMPUTING SYSTEM USING TRACING

TECHNICAL FIELD

The present disclosure relates generally to energy consumption in distributed computing systems. More specifically, but not by way of limitation, this disclosure relates to using tracing to monitor energy consumption associated with users of a distributed computing system.

BACKGROUND

Distributed computing systems have recently grown in popularity given their improved scalability, performance, resilience, and cost effectiveness. Distributed computing systems generally include a group of nodes (e.g., physical machines) in communication with each other via one or more networks, such as a local area network or the Internet. Examples of distributed computing systems can include cloud computing systems, data grids, and computing clusters. Distributed computing systems can be used for a wide range of purposes, such as for storing and retrieving data, executing software services, etc.

It is common for multiple users to interact with a single distributed computing system to perform various functions. For example, thousands of users may transmit requests to a distributed computing system over the course of a single day to use the system's software services. Examples of such requests can include read requests for reading data, write requests for writing data, deletion requests for deleting data, merge request for merging data, creation requests for creating files or directories, and rename requests for renaming files or directories. As the distributed computing system performs computing operations to respond to these requests, the distributed computing system can consume electrical energy.

Each request transmitted by a user may cause a particular computing operation or sequence of computing operations to be performed by one or more software services of the distributed computing system. For example, a user may issue a write request to store data in a distributed storage system (e.g., a Hadoop® Distributed File System), which is one type of distributed computing system. In response to receiving the write request, the distributed storage system may implement a series of computing operations. Examples of such computing operations can include authenticating the user to store the data, partitioning the data, breaking the data into streams, identifying an appropriate storage node on which to store the data, and then actually storing the data to a storage device (e.g., a hard drive or hard disk). Each of these computing operations may be performed by a different software service in the distributed computing system. Performing these computing operations can contribute to the overall energy consumed by the distributed computing system.

BRIEF DESCRIPTION OF THE DRAWINGS

FIG. 2 shows an example of tracing information according to some aspects of the present disclosure.

DETAILED DESCRIPTION

Figure 1:
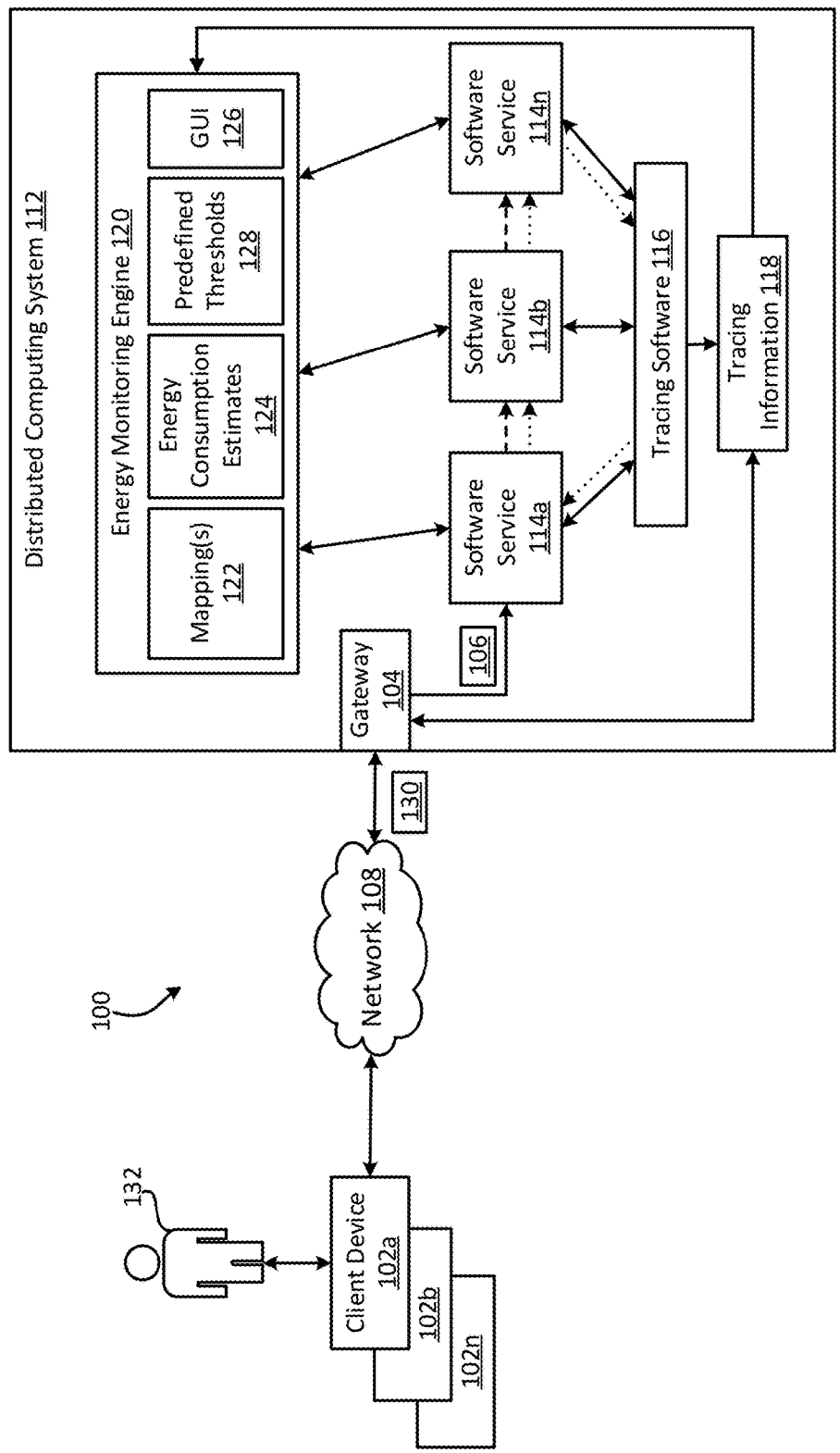
FIG. 1 shows a block diagram of an example of a system for using tracing to monitor energy consumption associated with users of a distributed computing system according to some aspects of the present disclosure.

Distributed computing systems such as distributed storage systems can handle requests from dozens or hundreds of users each day. Handling these requests can involve performing computing operations, which consumes electrical energy. In some circumstances, a single request from a single user can trigger a cascade of additional requests and service executions, which can each contribute to the overall energy consumption of the distributed computing system. For example, a user may issue a single request to a gateway associated with the distributed computing system. The gateway may, in turn, interact with multiple backend services that each execute one or more computing operations to effectuate an overall process that fulfills the request. A backend service is a software service (e.g., a microservice, serverless function, or application) executed on the backend of a computer system, as opposed to a frontend service which is a service executed on the frontend of the computer system. Executing each of these computing operations may contribute to the overall energy consumption of the distributed computing system.

Because of the complex and cascading interactions between the software services, it can be challenging to estimate energy consumption on a per-user basis. For example, a user may interact with a gateway of a distributed computing system to perform a task. In response, the gateway may interact with one or more backend services to help perform the task. But the backend services may be unaware of the identity of the user, because the gateway may not convey a user identifier to the backend services, and because at least some of the backend services may be triggered downstream in cascading interactions. This may make it challenging for the distributed computing system to attribute execution of the backend services to the user. This, in turn, can make it difficult to estimate how much of the total energy consumed by backend services to attribute to the user. Without knowing how much of the total energy consumed by the backend services to attribute to the user, it can be challenging to determine how much of the total energy consumed by the distributed computing system to attribute to the user. And knowing how much of the total energy consumed by the distributed computing system to attribute to each user can be important for various reasons, for example to balance energy loads across the physical infrastructure of the distributed computing system, manage account tiers, and apportion costs.

Some examples of the present disclosure can overcome one or more of the abovementioned problems by executing tracing software to track usage of software services by users of a distributed computing system and generate corresponding tracing information. In some such examples, the tracing software can perform distributed tracing (e.g., end-to-end tracing) to track which software services are executed in response to a request from a user. Distributed tracing can involve tracking requests as they flow between software services executing on different machines, for example as they flow from gateway devices executing gateway services to backend services and databases. The tracing software can then add an entry to the tracing information, where the entry associates the user with the service execution. As used herein, a service execution is an execution of a software service. This process can be repeated for each request from each user, to thereby generate a collection of tracing information that associates users with service executions. After the tracing information is generated, a system can automatically analyze the tracing information to apportion service executions among the users. The system can also determine an amount of electrical energy consumed by each software service, for example using a predefined mapping of software services to energy consumption amounts. By determining which software services were executed by each user, and the energy consumption of each software service, the system can generate an individualized energy consumption estimate for each user. The system can then generate a graphical user interface, such as a graphical dashboard, indicating the energy consumption estimates for some or all of the users. The graphical user interface may be viewed by the users, a network administrator, an engineer, or another entity to obtain useful insights about energy consumption in the distributed computing system.

Using tracing software to track usage of the software services by the users can provide several advantages. For example, the techniques described herein can be implemented without having to further modify the software services themselves (e.g., the gateway services or backend services). This can avoid introducing downtime and errors with respect to the software services. Additionally, existing tracing tools, such as OpenTelemetry which is normally used by programmers to perform debugging, can be easily modified to implement these techniques. This can reduce the development time and burden associated with implementing some aspects described herein.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for using tracing to monitor energy consumption associated with users of a distributed computing system 112 according to some aspects of the present disclosure. The system 100 can include any number of client devices 102a-n, such as laptop computers, desktop computers, mobile phones, and tablets. The client devices 102a-n can be in communication with the distributed computing system 112 via one or more networks 108, such as the Internet. The distributed computing system 112 can include any number and combination of networked nodes (e.g., physical or virtual machines). The client devices 102a-n can interact with the distributed computing system 112 to perform tasks. For instance, in an example in which the distributed computing system 112 is a distributed storage system, the client devices 102a-n can interact with the distributed storage system to store and retrieve data.

The client devices 102a-n and the distributed computing system 112 can collectively form a client-server architecture. The distributed computing system 112 can include a gateway 104 for interfacing with the client devices 102a-n. The gateway 104 and the client devices may interact with one another to facilitate tasks requested by users. For example, the gateway 104 can include one or more gateway services, with which a client device 102a can interact to initiate execution of a task. Examples of the task can include a data storage task or a data retrieval task. In response to the interaction, the gateway 104 can transmit a corresponding request 106 to one or more backend services, such as software services 114a-n. The request 106 may trigger the execution of the one or more backend services. For example, the request 106 may trigger the execution of software service 114a, which in turn may trigger the execution of software service 114b, etc. Thus, a single request 106 from the gateway 104 may trigger a cascading sequence of service executions on the backend. This complexity can make it challenging to track which of the service executions are associated with the original request 106. And because the request 106 may lack a user identifier, it may also be challenging to attribute some or all of the service executions to the user 132.

To help overcome the abovementioned problems, the distributed computing system 112 can include tracing software 116. The tracing software 116 can implement a distributed tracing process to track a series of service executions, initiated by a request, across one or more nodes of the distributed computing system 112. The tracing software 116 can then generate a trace describing the series of service executions. For example, a single trace can include unique identifiers of each software service that was executed in the chain. The trace can also include other information, such as a request identifier that uniquely identifies the originating request and a user identifier that uniquely identifies the user 132 that initiated the request. The tracing software 116 can store each trace as its own entry within a set of tracing information 118 (e.g., a log). These entries can be referred to as tracing entries, because they are entries that include traces.

In the example shown in FIG. 1, a user 132 can interact with the gateway 104 via the client device 102a. In response to the interaction, gateway 104 can transmit a request 106. The gateway 104 can also transmit a request identifier associated with the request 106, a user identifier associated with the user 132, or both of these to the tracing software 116. The request 106 can be transmitted to the software service 114a, which can execute one or more computing operations in response to receiving the request 106. The software service 114a may also transmit the same request 106 or a different request to software service 114b. This request is represented in FIG. 1 by a dashed arrow between software service 114a and software service 114b. In response to receiving the request, the software service 114b can execute one or more computing operations. The software service 114b may also transmit the same request 106 or a different request to software service 114n. This request is represented in FIG. 1 by a dashed arrow between software service 114b and software service 114n. And so on. In this way, requests can be passed between the software services 114a-n that cause them to perform various computing operations in sequence or in parallel. The tracing software 116 can detect the service executions, generate a corresponding trace entry that associates the service executions with the original request 106 and the user 132, and store the trace entry in the tracing information 118. If the other client devices 102b-n also transmit requests that trigger the execution of one or more of the software services 114a-n, the tracing software 116 can perform similar functionality to create corresponding trace entries in the tracing information 118.

One example of the tracing information 118 is shown in FIG. 2. As shown, the tracing information 118 can include a set of tracing entries 202a-e. Each of the tracing entries 202a-e can include a request identifier that uniquely identifies the originating request, a user identifier that uniquely identifies the user (e.g., user 132) that initiated the request, and one or more service identifiers that uniquely identify one or more software services that executed as a result of the request. Each of the tracing entries 202a-e may also include other information, such as operation identifiers that identify the one or more computing operations executed by each software service. In FIG. 2, tracing entry 202a indicates that a first user initiated a first request that resulted in the execution of software services #1, #2, and #4. Tracing entry 202b indicates that the first user initiated a second request that resulted in the execution of software services #1 and #3. Tracing entry 202c indicates that a second user initiated a third request that resulted in the execution of software services 1 and 6. Tracing entry 202d indicates that the first user initiated a fourth request that resulted in the execution of software services #2 and #5. Tracing entry 202e indicates that the second user initiated a fifth request that resulted in the execution of software services #2 and #4. Of course, in other examples the tracing entries 202a-e may each have more, less, or different information than described above. For example, the tracing entries 202a-e may each include one or more timestamps. The timestamps may include a receipt timestamp indicating a time at which the originating request was received by the distributed computing system 112, an end timestamp indicating a time at which the chain of software services finished executing, execution timestamps indicating when each of the software services in the daisy chain executed, or any combination of these.

Continuing with FIG. 1, the tracing software 116 may generate a trace in any number of ways. For example, the tracing software 116 can begin by providing the first software service in the execution chain with an initial trace. The initial trace can include a request identifier associated with the request 106 and a user identifier associated with the user 132 that initiated the request. After receiving the initial trace, the first software service can execute and append relevant information to the trace, such as identifiers of the executed computing operations. After updating the trace, the first software service can transmit the trace to the second software service 114b in the chain. The second software service can then execute and append relevant information to the trace, such as identifiers of the executed computing operations. After updating the trace, the second software service can transmit the trace to the third software service in the chain. The third software service can then execute and append relevant information to the trace, such as identifiers of the executed computing operations. This process can continue until the final software service in the chain is reached. After updating the trace, the final software service can provide the final trace to the tracing software 116, which can store the trace as a tracing entry in the tracing information 118. This distributed tracing process is represented in FIG. 1 by dotted arrows between the software services 114a-n and the tracing software 116.

After generating the tracing information 118, the distributed computing system can execute an energy monitoring engine 120 to process the tracing information 118. In particular, the energy monitoring engine 120 can analyze the tracing information 118 to apportion the service executions described therein among the users. For example, the energy monitoring engine 120 can identify a subset of the tracing information 118 associated with a predesignated time window. The energy monitoring engine 120 can then determine how many executions of a particular software service occurred within that time window based on requests from a first user, and how many executions of the particular software service occurred within that time window based on requests from a second user. In the example tracing information 118 shown in FIG. 2, there are two executions of software service 1 associated with the first user and one execution of software service 1 associated with the second user. Therefore, the first user is responsible for ⅔ of the executions of software service 1. A similar analysis can be performed for software service 2 to determine that the first user is responsible for ½ of the executions of software service 2, that the first user is responsible for all of the executions of software service 3, etc.

After apportioning the service executions among the users, the energy monitoring engine 120 can determine an energy consumption amount associated with the each software service. In some examples, the energy consumption amount may be an amount of energy consumed by each service execution (e.g., the amount of energy consumed each time a particular software service is executed). In other examples, the energy consumption amount may be more holistic, such as the total energy consumption by each software service during a predesignated time window. The energy monitoring engine 120 can determine the energy consumption amount using one or more predefined mappings 122. The mappings 122 can correlate the software services to their energy consumption amounts. In some examples, the mappings 122 can be generated based on sensor data or user input. For example, the energy monitoring engine 120 (or another component of the distributed computing system 112) can monitor the energy consumption of the software services 114a-n using sensors and log their energy consumption on a per-execution basis or over time. Examples of the sensors can be voltage sensors, current sensors, and power sensors. Additionally or alternatively, a user may manually input the energy consumption amounts associated with the software services 114a-n.

Figure 3:
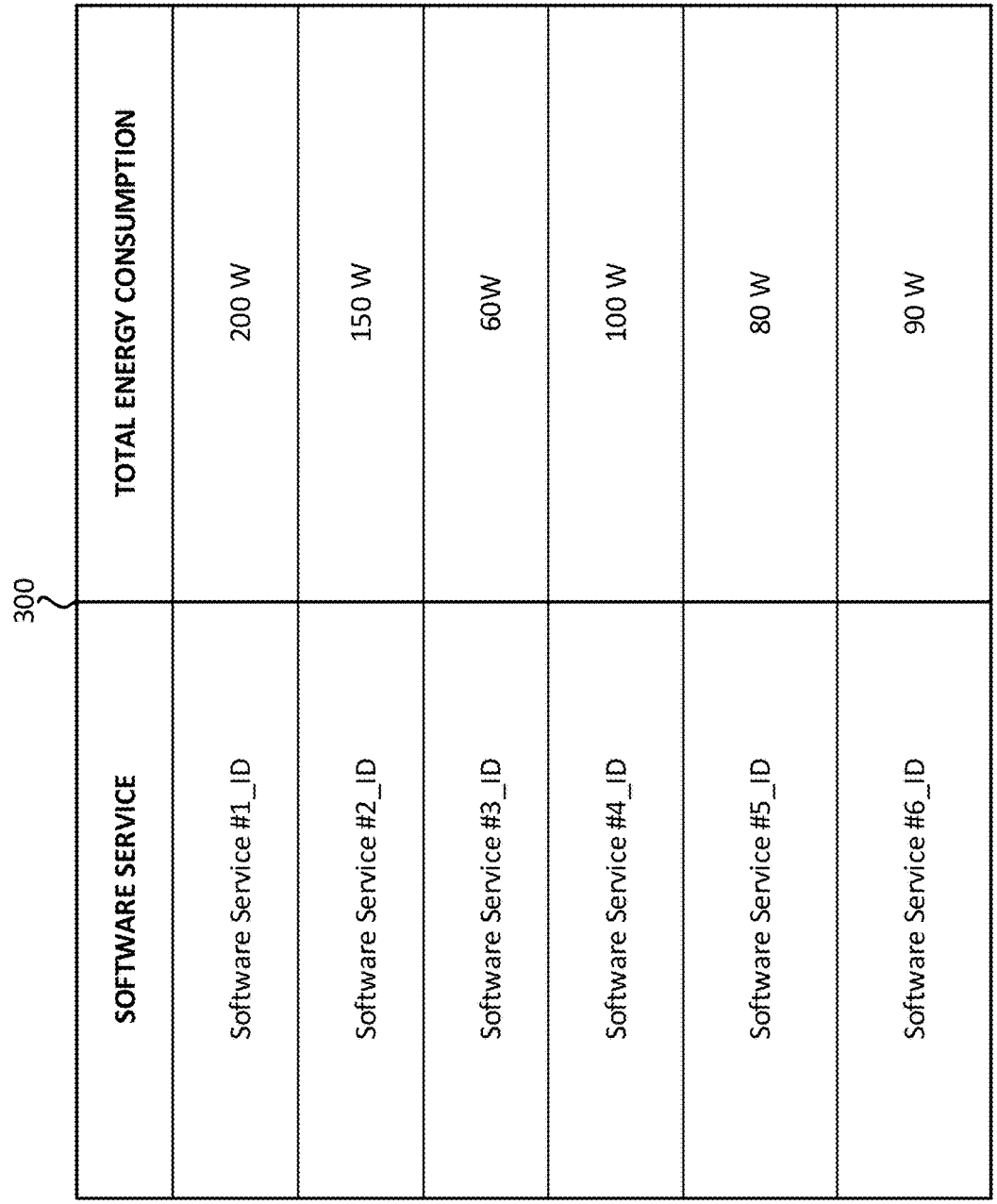
FIG. 3 shows an example of a mapping according to some aspects of the present disclosure.
Figure 4:
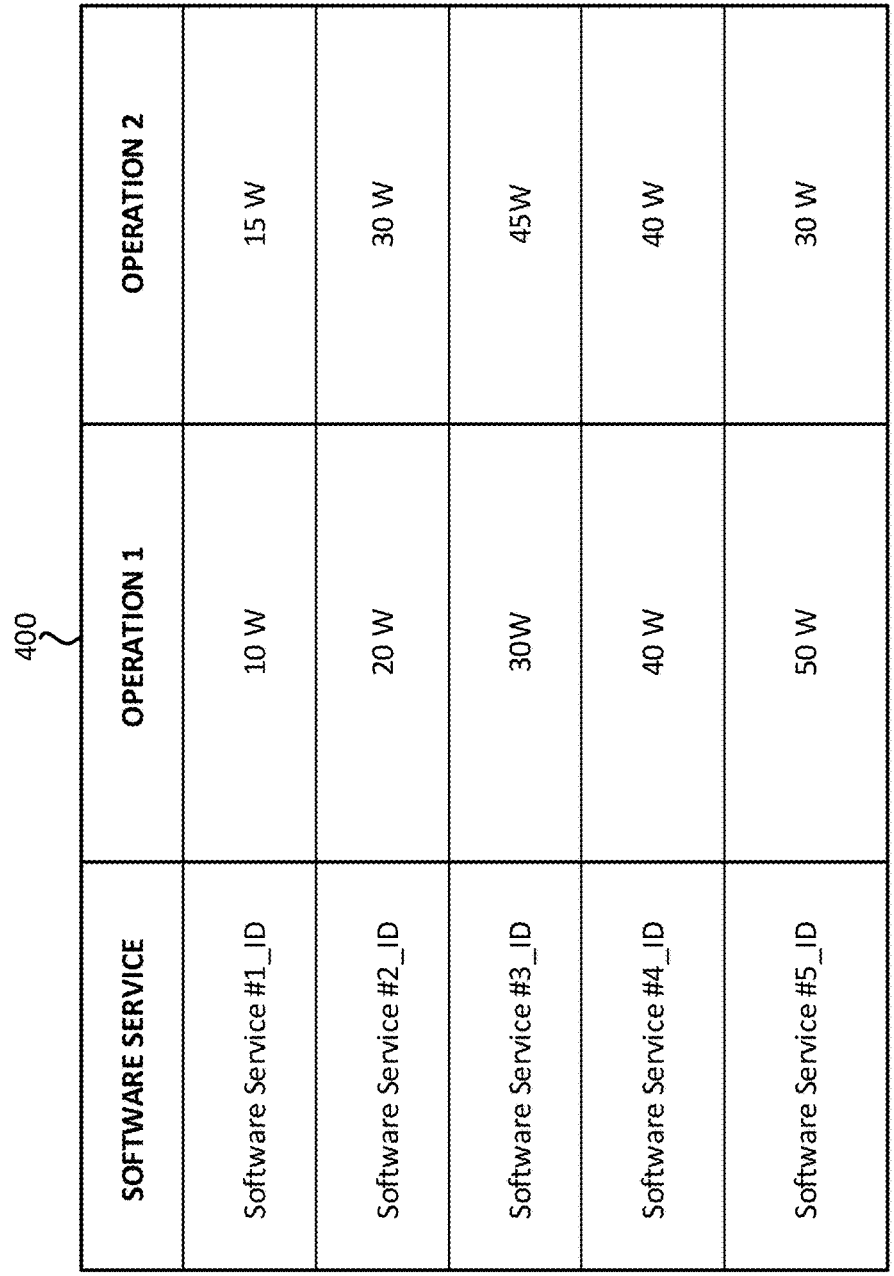
FIG. 4 shows an example of a mapping according to some aspects of the present disclosure.

One example of the mappings 122 is shown in FIG. 3. As shown, a mapping 300 can correlate software services to their total energy consumption during a particular time window. In this example, the software services are represented in the mapping 300 by their unique service identifiers. The time window may be selected by a user or may be a default length of time, such as 24 hours. Another example of a mappings 400 is shown in FIG. 4. This mapping 400 may be used in addition to, or as an alternative to, the mapping 300 shown in FIG. 3. As shown in FIG. 4, the mapping 400 can correlate specific computing operations to their respective energy consumptions. For example, software service #1 can consume 10 watts (W) when executing computing operation #1, which may be for example a read operation. Software service #1 can consume 15 W of power when executing computing operation #2, which may be for example a write operation. Software service #2 can consume 20 W when executing computing operation #1 and 30 W of power when executing computing operation #2. And so on. The mapping 400 shown in FIG. 4 may provide a higher degree of granularity about the energy consumption of the software services than the mapping 300 shown in FIG. 3.

Continuing with FIG. 1, having apportioned the service executions among the users and determined the energy consumption amounts associated with the software services, the energy monitoring engine 120 can next determine an energy consumption estimate 124 for each user. For example, referring to FIGS. 2-3 together, the energy monitoring engine 120 can determine energy consumption estimates 124 for the first user and the second user as shown below.

TABLE 1

Example Energy Consumption Estimates for Two Users

| | |
|---|---|
| First User | (2/3*Service_1_Energy) + (1/2*Service_2_Energy) + (1*Service_3_Energy) + (1/2*Service_4_Energy) + (1*Service_5_Energy) + (0*Service_6_Energy) = 398.3 W |
| Second User | (1/3*Service_1_Energy) + (1/2*Service_2_Energy) + (0*Service_3_Energy) + (1/2*Service_4_Energy) + (0*Service_5_Energy) + (1*Service_6_Energy) = 281.6 W |

After determining the energy consumption estimates 124 for the users, the energy monitoring engine 120 may be configured to perform one or more computing operations based on the energy consumption estimates 124. For example, the energy monitoring engine 120 can generate a graphical user interface 126 that includes the one or more of the energy consumption estimates 124. In some such examples, the graphical user interface 126 can be an interactive dashboard with which an individual (e.g., a network administrator or engineer) can select a graphical object corresponding to each user to display the energy consumption estimate 124 for that user. Additionally or alternatively, the energy monitoring engine 120 can generate graphical user interfaces 126 for the users indicating their respective energy consumption estimates 124. This may allow each of the users to gain insight into their own energy consumption.

In some examples, the energy monitoring engine 120 can perform an alerting function. For example, the energy monitoring engine 120 can determine whether the energy consumption estimate 124 for a user 132 exceeds a predefined threshold 128, which may or may not be specific to the user 132. The predefined threshold 128 may be set by the user 132; set by another entity such as a network administrator; or selected based on a predefined policy. In response to determining that the energy consumption estimate 124 for the user 132 exceeds the predefined threshold 128, the energy consumption estimate 124 can transmit an alert notification 130 to a recipient device. Examples of the recipient device can include a client device associated with the user (e.g., client device 102a) or a network administrator. This may warn the recipient that the user 132 is approaching or has exceeded permissible limits.

In some examples, the energy monitoring engine 120 can perform one or more remediation functions in response to determining that the energy consumption estimate 124 for a user 132 exceeds a predefined threshold 128. For example, the energy monitoring engine 120 can automatically adjust an account tier associated with the user 132. This may involve automatically increasing the user's account to a higher tier that allows for a higher level of energy consumption. Alternatively, the energy monitoring engine 120 can transmit a recommendation to the user 132 to switch to a higher account tier. If the user 132 approves the recommendation, the energy monitoring engine 120 can then update the user's account tier. As another example, the energy monitoring engine 120 can automatically throttle the user's ability to use some or all of the software services 114a-n to limit the user's energy consumption. For example, the energy monitoring engine 120 can automatically reject or queue some or all requests from the user 132 for at least a predefined time period to limit the user's energy consumption.

It will be appreciated that FIG. 1 is intended to be illustrative and non-limiting. Other examples may include more components, fewer components, different components, or a different arrangement of components than is shown in FIG. 1. For instance, in other examples the energy monitoring engine 120 may be located outside the distributed computing system 112 and have access to the tracing information 118, which may be stored in a location (e.g., repository) that is internal or external to the distributed computing system 112.

Figure 5:
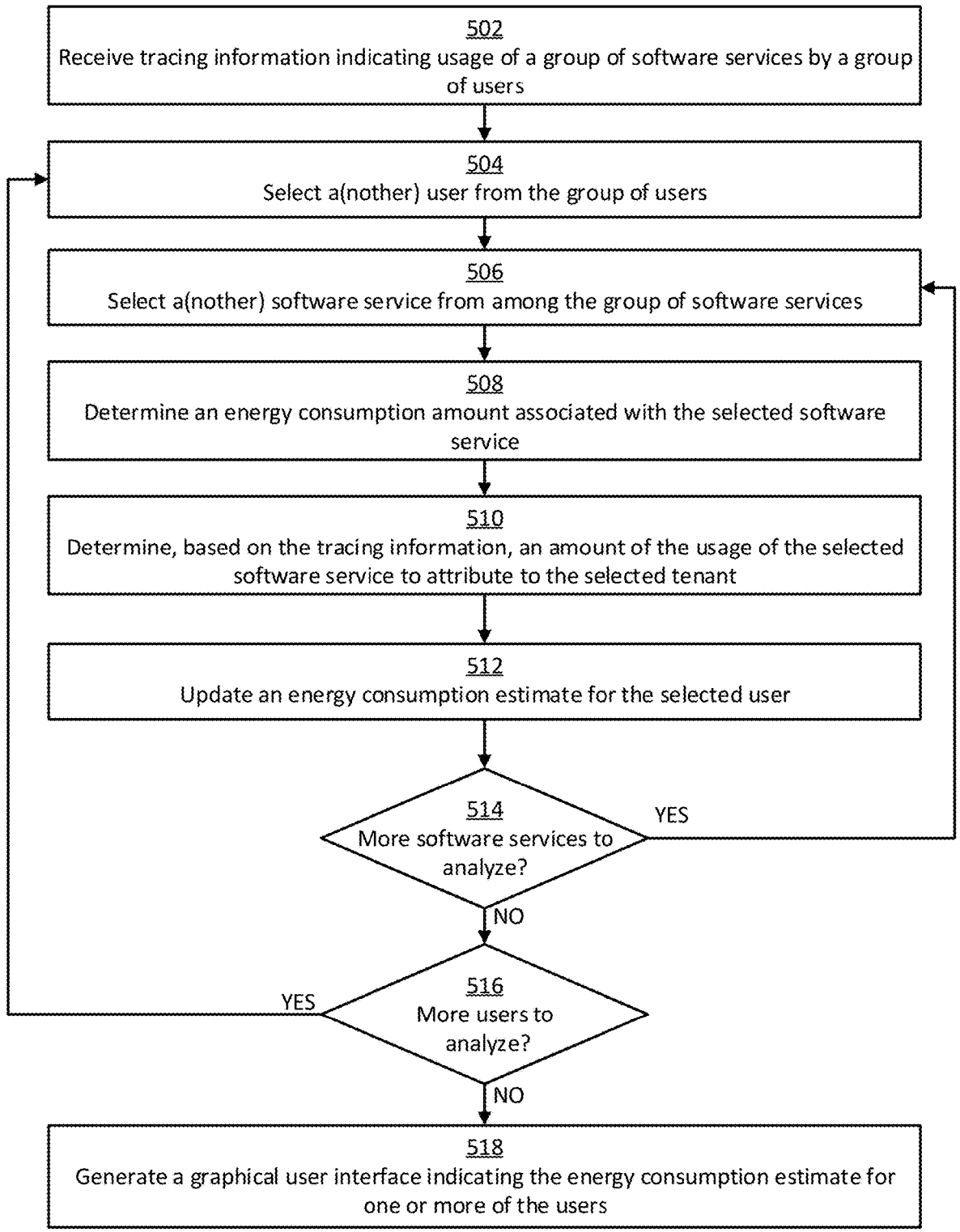
FIG. 5 shows a flowchart of an example of a process for determining energy consumption estimates for users according to some aspects of the present disclosure.

FIG. 5 shows a flowchart of an example of a process for determining energy consumption estimates for users according to some aspects of the present disclosure. Other examples may involve more steps, fewer steps, different steps, or a different order of steps than is shown in FIG. 5. The steps of FIG. 5 are described below with reference to the components of FIG. 1 described above.

In block 502, an energy monitoring engine 120 receives tracing information 118 indicating usage of a group of software services 114a-n by a group of users. The energy monitoring engine 120 can receive the tracing information 118 from a repository or any other suitable location. The tracing information 118 can be generated by tracing software 116 executed in relation to the group of software services 114a-n.

In block 504, the energy monitoring engine 120 selects a user from among the group of user. An example of the selected user can be user 132.

In block 506, the energy monitoring engine 120 selects a software service from among the group of software services 114a-n. An example of the selected software service can be software service 114a.

In block 508, the energy monitoring engine 120 determines an energy consumption amount associated with the selected software service. For example, the energy monitoring engine 120 can use one or more mappings 122 to determine how much energy was consumed by the selected software service during a selected time window.

In block 510, the energy monitoring engine 120 determines, based on the tracing information 118, an amount of the usage of the selected software service to attribute to the selected user. For example, the energy monitoring engine 120 can execute the operations shown in FIG. 6 to determine how much of the usage of the software service during the time window to attribute to the selected user. Those operations will be described in greater detail later on.

In block 512, the energy monitoring engine 120 updates an energy consumption estimate 124 for the selected user. For example, the energy monitoring engine 120 can determine at least a portion of the energy consumption amount (from block 508) that is to be attributed to the selected user. This determination can be made based on the amount of the service usage attributed to the selected user (in block 510). The energy monitoring engine 120 can then incorporate the portion into the user's energy consumption estimate 124, for example by adding the portion into the energy consumption estimate 124.

In block 514, the energy monitoring engine 120 determines whether there are more software services to analyze. For example, the energy monitoring engine 120 can determine if it has analyzed all of the software services listed in the tracing information 118 as being executed during a predesignated time window. An example of the predesignated time window may be the prior 24 hours. If the energy monitoring engine 120 has analyzed all of the software services listed in the tracing information 118 as being executed during the predesignated time window, then the energy monitoring engine 120 may determine that there are no other software services to analyze. So, the process can proceed to block 516. Otherwise, the process can return to block 506, where the energy monitoring engine 120 can select a next software service to analyze from among the group of software services. An example of the next software service can be software service 114b.

In block 516, the energy monitoring engine 120 determines whether there are more users to analyze. For example, the energy monitoring engine 120 can determine if it has analyzed all of the users associated with a predesignated time window in the tracing information 118. As another example, the energy monitoring engine 120 can determine if it has analyzed all of the users on a predefined user list. If the energy monitoring engine 120 has analyzed all of the users, then the energy monitoring engine 120 may determine that there are no other users to analyze. So, the process can proceed to block 518. Otherwise, the process can return to block 504, where the energy monitoring engine 120 can select a next user to analyze from among the group of users.

In block 518, the energy monitoring engine 120 generates a graphical user interface 126 indicating the energy consumption estimate 124 one or more of the users. In some examples, the graphical user interface 126 can include an interactive dashboard configured for use by a system administrator, engineer, or another entity that is different from the users. The graphical user interface 126 may include charts, graphs, and other graphical elements configured to help the entity visualize the energy consumption of each user. The entity can interact with the graphical user interface 126 to display some or all of the energy consumption estimates 124, as well as to obtain more granular information about each energy consumption estimate 124, such as one or more factors contributing to the estimate. Additionally or alternatively, the graphical user interface 126 can be configured for use by the users. The graphical user interface 126 may include charts, graphs, and other graphical elements to help the user visualize their energy consumption. A user can interact with their graphical user interface 126 to receive more granular information about their energy consumption estimate 124, such as one or more factors contributing to the estimate.

Figure 6:
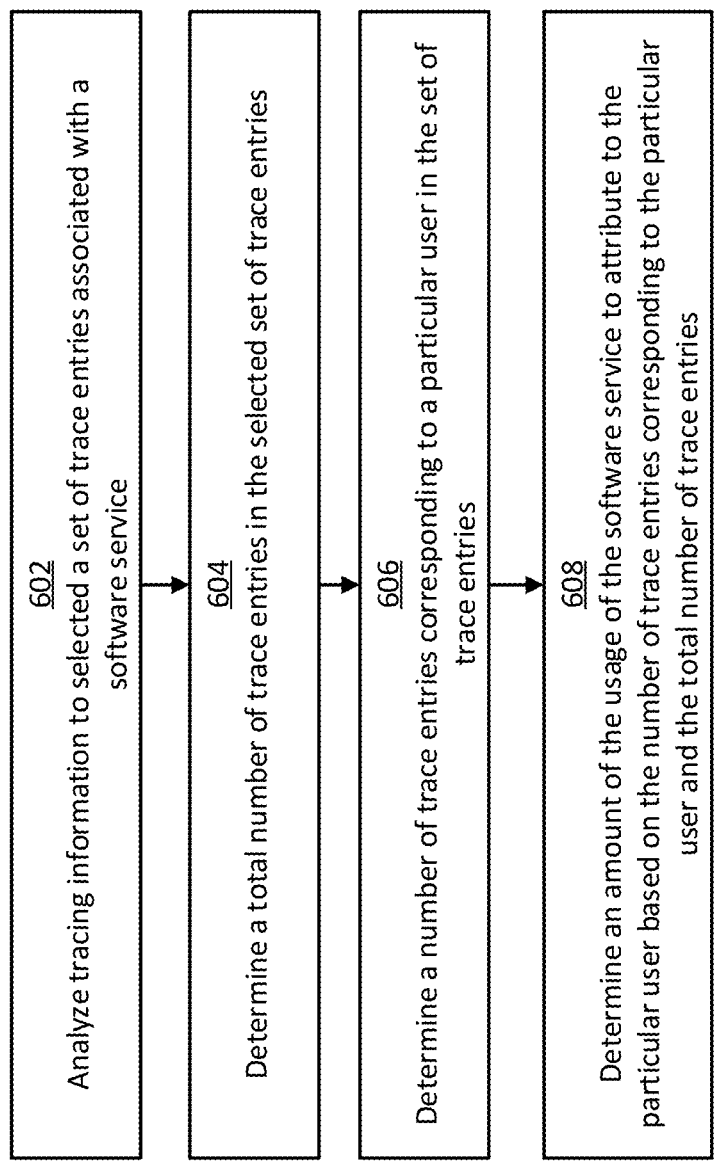
FIG. 6 shows a flowchart of an example of a process for determining how much of a software service's usage to attribute to a user according to some aspects of the present disclosure.

One example of a process for determining how much of a software service's usage to attribute to a user is shown in FIG. 6. Other examples may involve more steps, fewer steps, different steps, or a different order of steps than is shown in FIG. 6. The steps of FIG. 6 are described below with reference to the components of FIG. 1 described above.

In block 602, an energy monitoring engine 120 can analyze tracing information 118 to select a set of trace entries associated with a software service, such as software service 114a. For example, referring to FIG. 2, the energy monitoring engine 120 can analyze tracing information 118 to identify all trace entries 202a-c associated with software service #1. In some examples, the energy monitoring engine 120 may only select trace entries that correspond to the software service and that are within a predesignated time window. For example, the energy monitoring engine 120 select all trace entries that are associated with the software service and that have timestamps within a certain range of times.

In block 604, the energy monitoring engine 120 determines a total number of trace entries in the selected set of trace entries. For instance, in the above example related to FIG. 2, the energy monitoring engine 120 may determine that there is a total of three trace entries 202a-c in the selected set of trace entries.

In block 606, the energy monitoring engine 120 determines a number of trace entries in the selected set of trace entries that correspond to a particular user. For instance, in the above example related to FIG. 2, the energy monitoring engine 120 may determine that two of the three trace entries 202a-c correspond to the first user.

In block 608, the energy monitoring engine 120 determines an amount (e.g., a portion) of the usage of the software service to attribute to the particular user based on the number of trace entries in the selected set of trace entries that correspond to a particular user, the total number of trace entries in the selected set of trace entries, or both. For instance, in the above example related to FIG. 2, the energy monitoring engine 120 can determine that $\frac{2}{3}$ of the trace entries correspond to the first user, so $\frac{2}{3}$ of the power consumption associated with the software service should be attributed to the first user. Similarly, the energy monitoring engine 120 can determine that $\frac{1}{3}$ of the trace entries correspond to the second user, so $\frac{1}{3}$ of the power consumption associated with the software service should be attributed to the second user.

In some examples, the energy monitoring engine 120 can access the mappings 122 to convert these proportions into power values. For example, the energy monitoring engine 120 can access the mapping 300 to determine that software service #1 is associated with 200 W of energy consumption. So, the energy monitoring engine 120 can attribute $\frac{2}{3}$ of the 200 W to the first user. This equates to 133.3 W. The energy monitoring engine 120 can also attribute $\frac{1}{3}$ of the 200 W to the second user. This equates to 66.6 W. These power values can then be added to the energy consumption estimate for each user.

Figure 7:
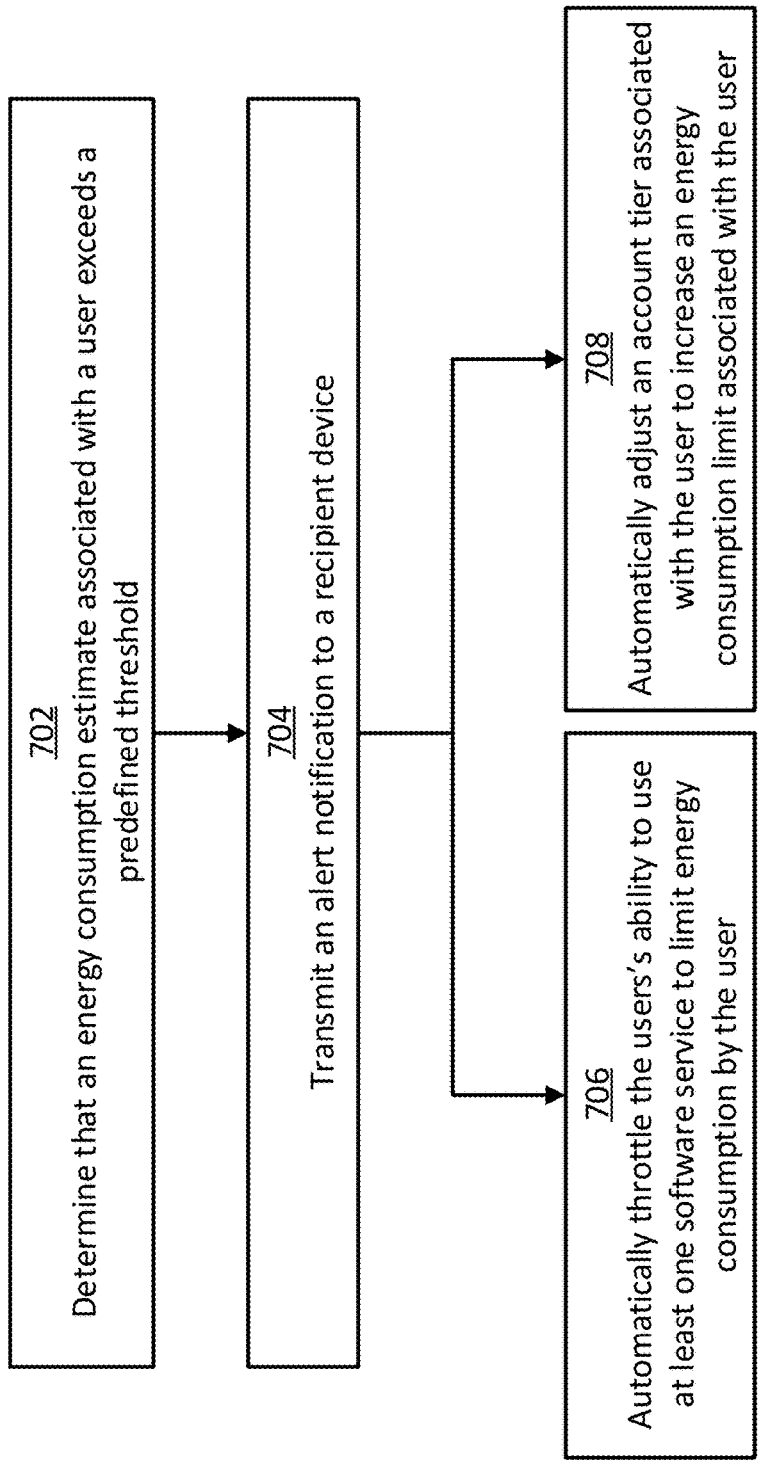
FIG. 7 shows a flowchart of an example of a process for handling overconsumption of energy by a user according to some aspects of the present disclosure.

If a user 132 is consuming too much energy, in some examples the energy monitoring engine 120 can perform one or more processes to help mitigate or resolve the problem. One example of such a process is shown in FIG. 7. Of course, other examples may involve more steps, fewer steps, different steps, or a different order of steps than is shown in FIG. 7. The steps of FIG. 7 are described below with reference to the components of FIG. 1 described above.

In block 702, the energy monitoring engine 120 determines that an energy consumption estimate 124 associated with a user 132 meets or exceeds a predefined threshold 128. For example, the energy monitoring engine 120 can compare the energy consumption estimate 124 to the threshold 128 to determine whether the energy consumption estimate 124 meets or exceeds the predefined threshold 128.

In block 704, the energy monitoring engine 120 transmits an alert notification 130 to a recipient device, in response to determining that the energy consumption estimate 124 associated with the user 132 meets or exceeds the predefined threshold 128. The alert notification 130 can include the energy consumption estimate 124 as well as other information, such as a maximum energy consumption level associated with the user's account tier and/or the predefined threshold 128. The recipient device can be a user device (e.g., client device 102a) associated with the user 132 or another entity. Examples of such user devices can include laptop computers, desktop computers, tablets, e-readers, smart phones, and wearable devices such as smart watches.

In block 706, the energy monitoring engine 120 automatically throttles the user's ability to use at least one software service (e.g., software service 114a) to limit energy consumption by the user 132. For example, the energy monitoring engine 120 may communicate with a load balancer or another component of the distributed computing system 112 to limit the number of requests from the user 132 that are processed within a certain time period. Limiting the number of requests may involve queueing or rejecting the requests, for example so that they are not immediately processed.

In block 708, the energy monitoring engine 120 automatically adjusts an account tier associated with the user 132 to increase an energy consumption limit associated with the user. For example, the energy monitoring engine 120 may communicate with a subscription subsystem or another component of the distributed computing system 112 to increase the user's account tier based on their energy consumption level. Different account tiers may have different energy allowances and costs.

Figure 8:
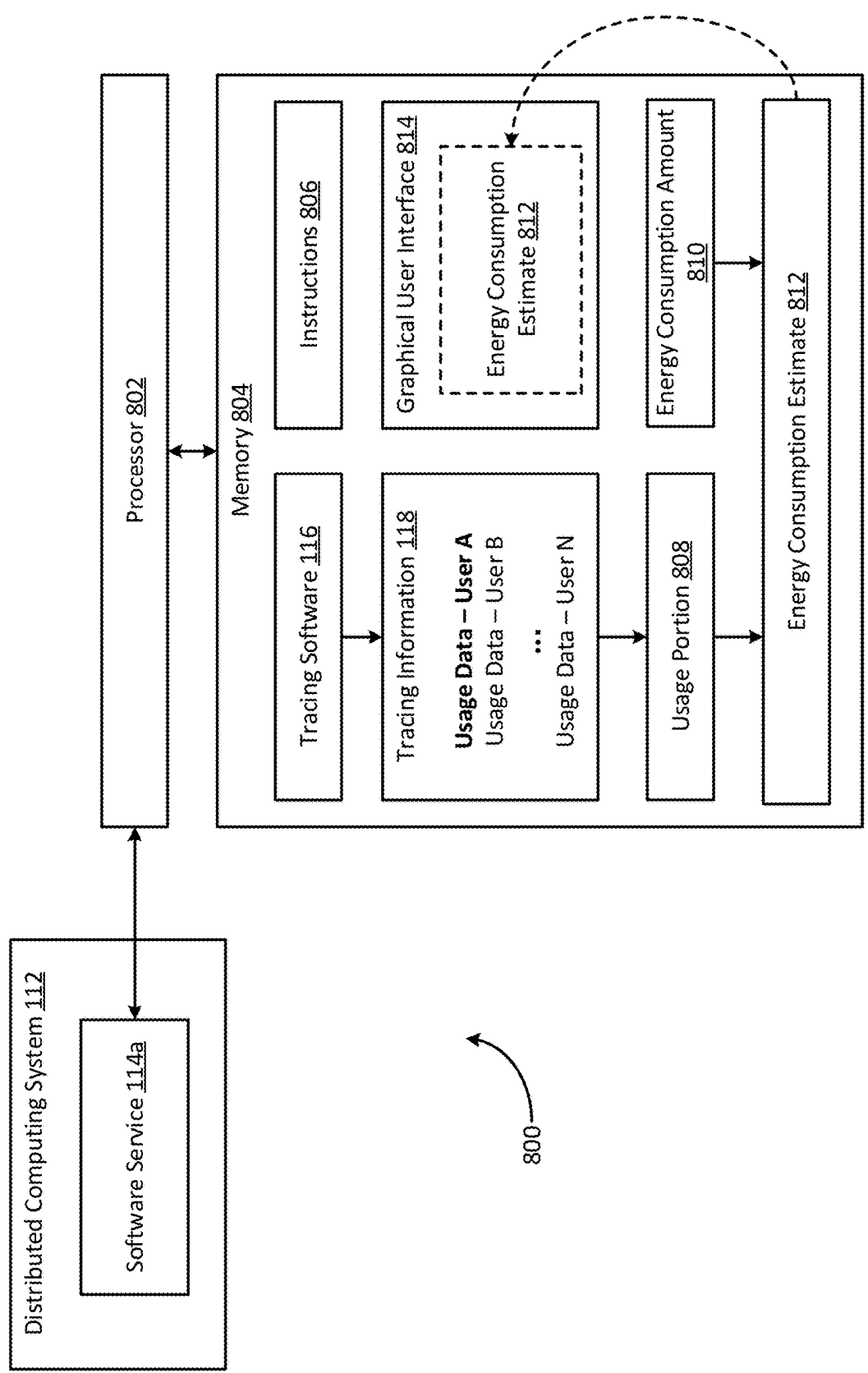
FIG. 8 shows a block diagram of an example of a system according to some aspects of the present disclosure.

FIG. 8 shows a block diagram of an example of a system 800 according to some aspects of the present disclosure. The system 800 includes a processor 802 communicatively coupled to a memory 804. In some examples, the processor 802 and the memory 804 may be parts of the same computing device such that they are within the same physical housing. In other examples, the processor 802 and the memory 804 can be distributed (e.g., in separate housings) and remote from one another.

The processor 802 can include one processing device or multiple processing devices. Examples of the processor 802 include a Field-Programmable Gate Array (FPGA), an application-specific integrated circuit (ASIC), and a microprocessor. The processor 802 can execute instructions 806 stored in the memory 804 to perform operations. The instructions 806 may include processor-specific instructions generated by a compiler or an interpreter from code written in any suitable computer-programming language, such as C, C++, C#, and Java. In some examples, the instructions 806 can correspond to the energy monitoring engine 120.

The memory 804 can include one memory device or multiple memory devices. The memory 804 can be volatile or non-volatile (e.g., it can retain stored information when powered off). Examples of the memory 804 include electrically erasable and programmable read-only memory (EEPROM), flash memory, or any other type of non-volatile memory. At least some of the memory 804 can include a non-transitory computer-readable medium from which the processor 802 can read instructions 806. A computer-readable medium can include electronic, optical, magnetic, or other storage devices capable of providing the processor 802 with computer-readable instructions or other program code. Examples of a computer-readable medium include magnetic disks, memory chips, ROM, random-access memory RAM, an ASIC, a configured processor, optical storage, or any other medium from which a computer processor can read the instructions 806.

In some examples, the processor 802 can execute the instructions 806 to perform operations. For example, the processor 802 can execute tracing software 116 configured to track usage of a software service 114a in a distributed computing system 112 and generate tracing information 118 that attributes the usage of the software service 114a to a plurality of users of the distributed computing system 112. The processor 802 can analyze the tracing information 118 to determine a portion 808 of the usage to attribute to a user (e.g., User A) of the plurality of users. The processor 802 can determine an energy consumption estimate 812 for the user based on the portion 808 of the usage associated with the user and an energy consumption amount 810 associated with the software service 114a. The processor 802 may, in some examples, determine the energy consumption amount 810 based on one or more predefined mappings, such as mappings 122 of FIG. 1. The processor 802 can then generate a graphical user interface 814 indicating the energy consumption estimate 812 associated with the user.

Figure 9:
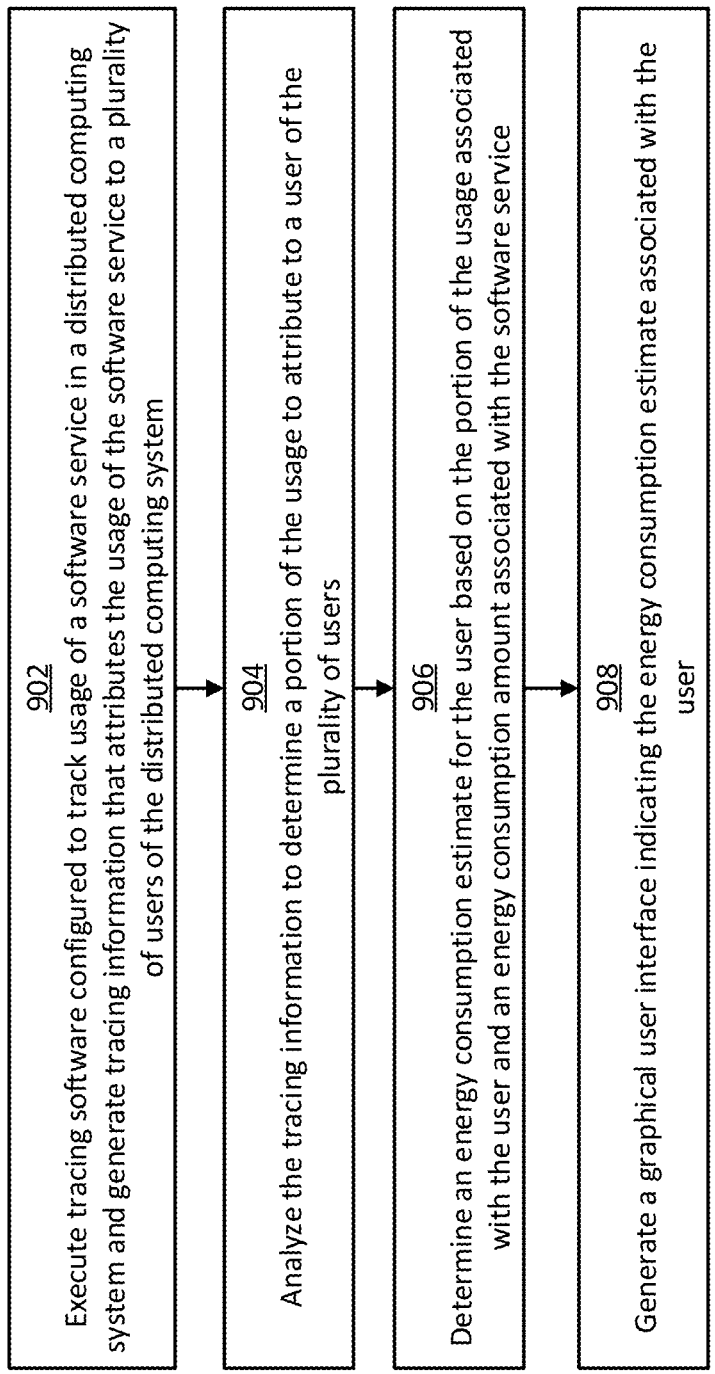
FIG. 9 shows a flowchart of an example of a process for using tracing to monitor energy consumption associated with a user of a distributed computing system according to some aspects of the present disclosure.

FIG. 9 shows a flowchart of an example of a process for using tracing to monitor energy consumption associated with a user of a distributed computing system according to some aspects of the present disclosure. Other examples may involve more steps, fewer steps, different steps, or a different order of steps than is shown in FIG. 9. The steps of FIG. 9 are described below with reference to the components of FIG. 8 described above.

In block 902, the processor 802 executes tracing software 116 configured to track usage of a software service 114a in a distributed computing system 112 and generate tracing information 118 that attributes the usage of the software service 114a to a plurality of users of the distributed computing system 112.

In block 904, the processor 802 analyzes the tracing information 118 to determine a portion 808 of the usage to attribute to a user (e.g., User A) of the plurality of users. For example, the processor 802 can implement the process shown in FIG. 6 to determine the portion 808 of the usage to attribute to the user.

In block 906, the processor 802 determines an energy consumption estimate 812 for the user based on the portion 808 of the usage associated with the user and an energy consumption amount 810 associated with the software service 114a. The processor 802 may determine the energy consumption amount 810 based on one or more predefined mappings, sensor data, or a combination thereof.

In block 908, the processor 802 generates a graphical user interface 814 indicating the energy consumption estimate 812 associated with the user. The processor 802 can then provide the graphical user interface 814 to any suitable number and combination of recipients, for example by transmitting the graphical user interface 814 over a network to a user device associated with the user, to a user device associated with a network administrator, or both.

In some aspects, energy consumption associated with users of a distributed computing system can be monitored using tracing in accordance with one or more of the following examples. As used below, any references to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to: execute tracing software configured to track usage of a software service in a distributed computing system and generate tracing information that attributes the usage of the software service to a plurality of users of the distributed computing system; analyze the tracing information to determine a portion of the usage to attribute to a user of the plurality of users; determine an energy consumption estimate for the user based on the portion of the usage associated with the user and an energy consumption amount associated with the software service; and generate a graphical user interface indicating the energy consumption estimate associated with the user.

Example #2: The non-transitory computer-readable medium of Example #1, wherein the energy consumption amount is a total amount of energy consumed by the software service during a predefined time window, and further comprising program code that is executable by the one or more processors for causing the one or more processors to: determine the energy consumption estimate for the user by multiplying the portion of the usage associated with the user by the energy consumption amount.

Example #3: The non-transitory computer-readable medium of any of Examples #1-2, wherein the tracing information includes a plurality of tracing entries, each tracing entry of the plurality of tracing entries including a respective request identifier that uniquely identifies a request that triggered execution of the software service, and each tracing entry of the plurality of tracing entries including a respective user identifier that uniquely identifies a particular user associated with the request from among the plurality of users.

Example #4: The non-transitory computer-readable medium of any of Examples #1-3, further comprising program code that is executable by the one or more processors for causing the one or more processors to: for each respective user of the plurality of users: analyze the tracing information to determine a respective portion of the usage of the software service to attribute to the respective user; and determine a respective energy consumption estimate for the respective user, the respective energy consumption estimate being determined based on the respective portion of the usage attributed to the respective user and the energy consumption amount associated with the software service; and generate the graphical user interface to include the respective energy consumption estimate associated with each respective user of the plurality of users.

Example #5: The non-transitory computer-readable medium of any of Examples #1-4, further comprising program code that is executable by the one or more processors for causing the one or more processors to: execute the tracing software to track the usage of a plurality of software services and generate the tracing information, wherein the plurality of software services include the software service, and wherein the tracing information attributes the usage of the plurality of software services to the plurality of users; and generate the energy consumption estimate for the user by, for each respective software service of the plurality of software services: analyzing the tracing information to determine a respective portion of the usage of the respective software service to attribute to the user; determining a respective energy consumption amount associated with the respective software service; determining a respective portion of the respective energy consumption amount to attribute to the user, based on the respective portion of the usage attributed to the user; and incorporating the respective portion into the energy consumption estimate for the user.

Example #6: The non-transitory computer-readable medium of any of Examples #1-5, wherein the tracing software is separate from the software service.

Example #7: The non-transitory computer-readable medium of any of Examples #1-6, further comprising program code that is executable by the one or more processors for causing the one or more processors to: determine that the energy consumption estimate for the user exceeds a predefined threshold; and based on determining that the energy consumption estimate for the user exceeds the predefined threshold, automatically adjust an account tier associated with the user to increase an energy consumption limit associated with the user.

Example #8: The non-transitory computer-readable medium of any of Examples #1-7, further comprising program code that is executable by the one or more processors for causing the one or more processors to: determine that the energy consumption estimate for the user exceeds a predefined threshold; and based on determining that the energy consumption estimate for the user exceeds the predefined threshold, transmit an alert notification to a recipient device.

Example #9: The non-transitory computer-readable medium of any of Examples #1-6 and 8, further comprising program code that is executable by the one or more processors for causing the one or more processors to: determine that the energy consumption estimate for the user exceeds a predefined threshold; and based on determining that the energy consumption estimate for the user exceeds the predefined threshold, automatically throttle an ability of the user to use the software service to limit energy consumption by the user.

Example #10: The non-transitory computer-readable medium of any of Examples #1-8, wherein the energy consumption amount corresponds to a particular operation among a plurality of operations that are executable by the software service, wherein the tracing information indicates that the particular operation was performed by the software service for the user, and further comprising program code that is executable by the one or more processors for causing the one or more processors to: access a predefined mapping that correlates the plurality of operations to a plurality of energy consumption amounts, each operation of the plurality of operations being correlated in the predefined mapping to a respective energy consumption amount of the plurality of energy consumption amounts; and determine the energy consumption amount associated with the operation using the predefined mapping.

Example #11: The non-transitory computer-readable medium of any of Examples #1-10, further comprising program code that is executable by the one or more processors for causing the one or more processors to: analyze the tracing information to select a plurality of trace entries that are associated with the software service and that correspond to a predesignated time window; determine a total number of trace entries in the plurality of trace entries; determine a number of trace entries that correspond to the user in the plurality of trace entries; and determine the portion of the usage to attribute to the user based on the number of trace entries corresponding to the user and the total number of trace entries.

Example #12: A method comprising: executing, by one or more processors, tracing software configured to track usage of a software service in a distributed computing system and generate tracing information that attributes the usage of the software service to a plurality of users of the distributed computing system; analyzing, by the one or more processors, the tracing information to determine a portion of the usage to attribute to a user of the plurality of users; determining, by the one or more processors, an energy consumption estimate for the user based on the portion of the usage associated with the user and an energy consumption amount associated with the software service; and generating, by the one or more processors, a graphical user interface indicating the energy consumption estimate associated with the user.

Example #13: The method of Example #12, further comprising: for each respective user of the plurality of users: analyzing the tracing information to determine a respective portion of the usage of the software service to attribute to the respective user; and determining a respective energy consumption estimate for the respective user, the respective energy consumption estimate being determined based on the respective portion of the usage attributed to the respective user and the energy consumption amount associated with the software service; and generating the graphical user interface to include the respective energy consumption estimate associated with each respective user of the plurality of users.

Example #14: The method of any of Examples #12-13, further comprising: executing the tracing software to track the usage of a plurality of software services and generate the tracing information, wherein the plurality of software services include the software service, and wherein the tracing information attributes the usage of the plurality of software services to the plurality of users; and generating the energy consumption estimate for the user by, for each respective software service of the plurality of software services: analyzing the tracing information to determine a respective portion of the usage of the respective software service to attribute to the user; determining a respective energy consumption amount associated with the respective software service; determining a respective portion of the respective energy consumption amount to attribute to the user, based on the respective portion of the usage attributed to the user; and incorporating the respective portion into the energy consumption estimate for the user.

Example #15: The method of any of Examples #12-14, further comprising: determining that the energy consumption estimate for the user exceeds a predefined threshold; and based on determining that the energy consumption estimate for the user exceeds the predefined threshold, automatically adjusting an account tier associated with the user to increase an energy consumption limit associated with the user.

Example #16: The method of any of Examples #12-15, further comprising: determining that the energy consumption estimate for the user exceeds a predefined threshold; and based on determining that the energy consumption estimate for the user exceeds the predefined threshold, transmitting an alert notification to a recipient device.

Example #17: The method of any of Examples #12-14 and 16, further comprising: determining that the energy consumption estimate for the user exceeds a predefined threshold; and based on determining that the energy consumption estimate for the user exceeds the predefined threshold, automatically throttling an ability of the user to use the software service to limit energy consumption by the user.

Example #18: The method of any of Examples #12-17, wherein the energy consumption amount corresponds to a particular operation among a plurality of operations that are executable by the software service, wherein the tracing information indicates that the particular operation was performed by the software service for the user, and further comprising: accessing a predefined mapping that correlates the plurality of operations to a plurality of energy consumption amounts, each operation of the plurality of operations being correlated in the predefined mapping to a respective energy consumption amount of the plurality of energy consumption amounts; and determining the energy consumption amount associated with the operation using the predefined mapping.

Example #19: The method of Example #12, further comprising: analyzing the tracing information to select a plurality of trace entries that are associated with the software service and that correspond to a predesignated time window; determining a number of trace entries that correspond to the user in the plurality of trace entries; and determining the portion of the usage to attribute to the user based on the number of trace entries corresponding to the user.

Example #20: A system comprising: one or more processors; and a memory that includes instructions executable by the one or more processors for causing the one or more processors to: execute tracing software configured to track usage of a software service in a distributed computing system and generate tracing information that attributes the usage of the software service to a plurality of users of the distributed computing system; analyze the tracing information to determine a portion of the usage to attribute to a user of the plurality of users; determine an energy consumption estimate for the user based on the portion of the usage associated with the user and an energy consumption amount associated with the software service; and generate a graphical user interface indicating the energy consumption estimate for the user.

Example #21: A non-transitory computer-readable medium comprising program code that is executable by one or more processors for causing the one or more processors to: receive tracing information that attributes usage of a software service to a plurality of users of a distributed computing system; determine, based on the tracing information, a portion of the usage to attribute to a user of the plurality of users; determine an energy consumption amount associated with the software service; and determine an energy consumption estimate for the user based on the portion of the usage associated with the user and the energy consumption amount associated with the software service.

Example #22: The non-transitory computer-readable medium of Example #21, further comprising program code that is executable by the one or more processors for causing the one or more processors to: access a predefined mapping that correlates a plurality of software services to a plurality of energy consumption amounts, each software service of the plurality of software services being correlated in the predefined mapping to a respective energy consumption amount of the plurality of energy consumption amounts; and determine the energy consumption amount associated with the software service using the predefined mapping.

Example #23: The non-transitory computer-readable medium of any of Examples #21-22, wherein the energy consumption amount corresponds to a particular operation among a plurality of operations that are executable by the software service, wherein the tracing information indicates that the particular operation was performed by the software service for the user, and further comprising program code that is executable by the one or more processors for causing the one or more processors to: access a predefined mapping that correlates the plurality of operations to a plurality of energy consumption amounts, each operation of the plurality of operations being correlated in the predefined mapping to a respective energy consumption amount of the plurality of energy consumption amounts; and determine the energy consumption amount associated with the operation using the predefined mapping.

Example #24: The non-transitory computer-readable medium of any of Examples #21-23, further comprising program code that is executable by the one or more processors for causing the one or more processors to: analyze the tracing information to select a plurality of trace entries associated with the software service, the plurality of trace entries including all trace entries associated with the software service during a predesignated time window; determine a total number of trace entries in the plurality of trace entries; determine a number of trace entries that correspond to the user in the plurality of trace entries; and determine the portion of the usage to attribute to the user based on the number of trace entries corresponding to the user and the total number of trace entries.

Example #25: A method comprising: receiving, by one or more processors, tracing information that attributes usage of a software service to a plurality of users of a distributed computing system; determining, by the one or more processors and based on the tracing information, a portion of the usage to attribute to a user of the plurality of users; determining, by the one or more processors, an energy consumption amount associated with the software service; and determining, by the one or more processors, an energy consumption estimate for the user based on the portion of the usage associated with the user and the energy consumption amount associated with the software service.

Example #26: The method of Example #25, further comprising: accessing a predefined mapping that correlates a plurality of software services to a plurality of energy consumption amounts, each software service of the plurality of software services being correlated in the predefined mapping to a respective energy consumption amount of the plurality of energy consumption amounts; and determining the energy consumption amount associated with the software service using the predefined mapping.

Example #27: The method of any of Examples #25-26, wherein the energy consumption amount corresponds to a particular operation among a plurality of operations that are executable by the software service, wherein the tracing information indicates that the particular operation was performed by the software service for the user, and further comprising: accessing a predefined mapping that correlates the plurality of operations to a plurality of energy consumption amounts, each operation of the plurality of operations being correlated in the predefined mapping to a respective energy consumption amount of the plurality of energy consumption amounts; and determining the energy consumption amount associated with the operation using the predefined mapping.

Example #28: The method of any of Examples #25-27, further comprising: analyzing the tracing information to select a plurality of trace entries associated with the software service, the plurality of trace entries including all trace entries associated with the software service during a pre-designated time window; determining a total number of trace entries in the plurality of trace entries; determining a number of trace entries that correspond to the user in the plurality of trace entries; and determining the portion of the usage to attribute to the user based on the number of trace entries corresponding to the user and the total number of trace entries.

Example #29: The method of any of Examples #25-28, further comprising: determining that the energy consumption estimate for the user exceeds a predefined threshold; and based on determining that the energy consumption estimate for the user exceeds the predefined threshold, transmitting an alert notification to a recipient device.

Example #30: A system comprising: one or more processors; and a memory that includes instructions executable by the one or more processors for causing the one or more processors to: receive tracing information that attributes usage of a software service to a plurality of users of a distributed computing system; determine, based on the tracing information, a portion of the usage to attribute to a user of the plurality of users; determine an energy consumption amount associated with the software service; and determine an energy consumption estimate for the user based on the portion of the usage associated with the user and the energy consumption amount associated with the software service.

Example #31: A system comprising: means for executing tracing software configured to track usage of a software service in a distributed computing system and generate tracing information that attributes the usage of the software service to a plurality of users of the distributed computing system; means for analyzing the tracing information to determine a portion of the usage to attribute to a user of the plurality of users; means for determining an energy consumption estimate for the user based on the portion of the usage associated with the user and an energy consumption amount associated with the software service; and means for generating a graphical user interface indicating the energy consumption estimate for the user.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors for causing the one or more processors to:
 execute tracing software configured to track usage of a software service in a distributed computing system and generate tracing information that attributes the usage of the software service to a plurality of users of the distributed computing system;
 analyze the tracing information to determine a portion of the usage to attribute to a user of the plurality of users;
 determine an energy consumption estimate for the user based on the portion of the usage associated with the user and an energy consumption amount associated with the software service; and
 generate a graphical user interface indicating the energy consumption estimate associated with the user.

2. The non-transitory computer-readable medium of claim 1, wherein the energy consumption amount is a total amount of energy consumed by the software service during a predefined time window, and further comprising program code that is executable by the one or more processors for causing the one or more processors to:
 determine the energy consumption estimate for the user by multiplying the portion of the usage associated with the user by the energy consumption amount.

3. The non-transitory computer-readable medium of claim 1, wherein the tracing information includes a plurality of tracing entries, each tracing entry of the plurality of tracing entries including a respective request identifier that uniquely identifies a request that triggered execution of the software service, and each tracing entry of the plurality of tracing entries including a respective user identifier that uniquely identifies a particular user associated with the request from among the plurality of users.

4. The non-transitory computer-readable medium of claim 1, further comprising program code that is executable by the one or more processors for causing the one or more processors to:
 for each respective user of the plurality of users:
  analyze the tracing information to determine a respective portion of the usage of the software service to attribute to the respective user; and determine a respective energy consumption estimate for the respective user, the respective energy consumption estimate being determined based on the respective portion of the usage attributed to the respective user and the energy consumption amount associated with the software service; and generate the graphical user interface to include the respective energy consumption estimate associated with each respective user of the plurality of users.

5. The non-transitory computer-readable medium of claim 1, further comprising program code that is executable by the one or more processors for causing the one or more processors to:

execute the tracing software to track the usage of a plurality of software services and generate the tracing information, wherein the plurality of software services include the software service, and wherein the tracing information attributes the usage of the plurality of software services to the plurality of users; and generate the energy consumption estimate for the user by, for each respective software service of the plurality of software services:

analyzing the tracing information to determine a respective portion of the usage of the respective software service to attribute to the user;

determining a respective energy consumption amount associated with the respective software service;

determining a respective portion of the respective energy consumption amount to attribute to the user, based on the respective portion of the usage attributed to the user; and incorporating the respective portion into the energy consumption estimate for the user.

6. The non-transitory computer-readable medium of claim 1, wherein the tracing software is separate from the software service.

7. The non-transitory computer-readable medium of claim 1, further comprising program code that is executable by the one or more processors for causing the one or more processors to:

determine that the energy consumption estimate for the user exceeds a predefined threshold; and based on determining that the energy consumption estimate for the user exceeds the predefined threshold, automatically adjust an account tier associated with the user to increase an energy consumption limit associated with the user.

8. The non-transitory computer-readable medium of claim 1, further comprising program code that is executable by the one or more processors for causing the one or more processors to:

determine that the energy consumption estimate for the user exceeds a predefined threshold; and based on determining that the energy consumption estimate for the user exceeds the predefined threshold, transmit an alert notification to a recipient device.

9. The non-transitory computer-readable medium of claim 1, further comprising program code that is executable by the one or more processors for causing the one or more processors to:

determine that the energy consumption estimate for the user exceeds a predefined threshold; and based on determining that the energy consumption estimate for the user exceeds the predefined threshold, automatically throttle an ability of the user to use the software service to limit energy consumption by the user.

10. The non-transitory computer-readable medium of claim 1, wherein the energy consumption amount corresponds to a particular operation among a plurality of operations that are executable by the software service, wherein the tracing information indicates that the particular operation was performed by the software service for the user, and further comprising program code that is executable by the one or more processors for causing the one or more processors to:

access a predefined mapping that correlates the plurality of operations to a plurality of energy consumption amounts, each operation of the plurality of operations being correlated in the predefined mapping to a respective energy consumption amount of the plurality of energy consumption amounts; and determine the energy consumption amount associated with the operation using the predefined mapping.

11. The non-transitory computer-readable medium of claim 1, further comprising program code that is executable by the one or more processors for causing the one or more processors to:

analyze the tracing information to select a plurality of trace entries that are associated with the software service and that correspond to a predesignated time window;

determine a total number of trace entries in the plurality of trace entries;

determine a number of trace entries that correspond to the user in the plurality of trace entries; and determine the portion of the usage to attribute to the user based on the number of trace entries corresponding to the user and the total number of trace entries.

12. A method comprising:

executing, by one or more processors, tracing software configured to track usage of a software service in a distributed computing system and generate tracing information that attributes the usage of the software service to a plurality of users of the distributed computing system;

analyzing, by the one or more processors, the tracing information to determine a portion of the usage to attribute to a user of the plurality of users;

determining, by the one or more processors, an energy consumption estimate for the user based on the portion of the usage associated with the user and an energy consumption amount associated with the software service; and generating, by the one or more processors, a graphical user interface indicating the energy consumption estimate associated with the user.

13. The method of claim 12, further comprising:

for each respective user of the plurality of users:

analyzing the tracing information to determine a respective portion of the usage of the software service to attribute to the respective user; and determining a respective energy consumption estimate for the respective user, the respective energy consumption estimate being determined based on the respective portion of the usage attributed to the respective user and the energy consumption amount associated with the software service; and generating the graphical user interface to include the respective energy consumption estimate associated with each respective user of the plurality of users.

14. The method of claim 12, further comprising:

executing the tracing software to track the usage of a plurality of software services and generate the tracing information, wherein the plurality of software services include the software service, and wherein the tracing information attributes the usage of the plurality of software services to the plurality of users; and generating the energy consumption estimate for the user by, for each respective software service of the plurality of software services:
- analyzing the tracing information to determine a respective portion of the usage of the respective software service to attribute to the user;
- determining a respective energy consumption amount associated with the respective software service;
- determining a respective portion of the respective energy consumption amount to attribute to the user, based on the respective portion of the usage attributed to the user; and
- incorporating the respective portion into the energy consumption estimate for the user.

15. The method of claim 12, further comprising:
determining that the energy consumption estimate for the user exceeds a predefined threshold; and
based on determining that the energy consumption estimate for the user exceeds the predefined threshold, automatically adjusting an account tier associated with the user to increase an energy consumption limit associated with the user.

16. The method of claim 12, further comprising:
determining that the energy consumption estimate for the user exceeds a predefined threshold; and
based on determining that the energy consumption estimate for the user exceeds the predefined threshold, transmitting an alert notification to a recipient device.

17. The method of claim 12, further comprising:
determining that the energy consumption estimate for the user exceeds a predefined threshold; and
based on determining that the energy consumption estimate for the user exceeds the predefined threshold, automatically throttling an ability of the user to use the software service to limit energy consumption by the user.

18. The method of claim 12, wherein the energy consumption amount corresponds to a particular operation among a plurality of operations that are executable by the software service, wherein the tracing information indicates that the particular operation was performed by the software service for the user, and further comprising:
- accessing a predefined mapping that correlates the plurality of operations to a plurality of energy consumption amounts, each operation of the plurality of operations being correlated in the predefined mapping to a respective energy consumption amount of the plurality of energy consumption amounts; and
- determining the energy consumption amount associated with the operation using the predefined mapping.

19. The method of claim 12, further comprising:
analyzing the tracing information to select a plurality of trace entries that are associated with the software service and that correspond to a predesignated time window;
determining a number of trace entries that correspond to the user in the plurality of trace entries; and
determining the portion of the usage to attribute to the user based on the number of trace entries corresponding to the user.

20. A system comprising:
one or more processors; and
a memory that includes instructions executable by the one or more processors for causing the one or more processors to:
- execute tracing software configured to track usage of a software service in a distributed computing system and generate tracing information that attributes the usage of the software service to a plurality of users of the distributed computing system;
- analyze the tracing information to determine a portion of the usage to attribute to a user of the plurality of users;
- determine an energy consumption estimate for the user based on the portion of the usage associated with the user and an energy consumption amount associated with the software service; and
- generate a graphical user interface indicating the energy consumption estimate for the user.

* * * * *